United States Patent [19]
Chalasani et al.

[11] Patent Number: 5,547,622
[45] Date of Patent: Aug. 20, 1996

[54] BINDER FOR FIBER REINFORCED COMPOSITES

[75] Inventors: Devi Chalasani, Painted Post; Mark S. Friske, Campbell, both of N.Y.; Ronald E. Johnson, Tioga, Pa.

[73] Assignee: Corning Incorporated, Corning, N.Y.

[21] Appl. No.: 405,044

[22] Filed: Mar. 15, 1995

[51] Int. Cl.$^6$ ........................................... B28B 3/00
[52] U.S. Cl. ................................ 264/60; 156/89; 264/63; 264/122
[58] Field of Search ................................ 264/60, 63, 122; 156/89

[56] References Cited

U.S. PATENT DOCUMENTS

| | | |
|---|---|---|
| 4,314,852 | 2/1982 | Brennan et al. . |
| 4,615,987 | 10/1986 | Chyung et al. . |
| 5,024,978 | 6/1991 | Allaire et al. . |
| 5,512,351 | 4/1996 | Miyamichi . |

OTHER PUBLICATIONS

Reed, James S., "Introduction to the Principles of Ceramic Processing", John Wiley & Sons, pp. 159–165.

*Primary Examiner*—Donald E. Czaja
*Assistant Examiner*—Jacqueline Ann Ruller
*Attorney, Agent, or Firm*—Milton M. Peterson

[57] ABSTRACT

Fiber-reinforced, ceramic composite articles are manufactured by contacting inorganic reinforcing fibers with liquid dispersions containing powders of the ceramic matrix materials and an organic binder. The organic binder is a water-soluble polymer. The fibers coated with the ceramic powders are contacted with a cross-linking agent which reacts with binder to form a gel.

14 Claims, No Drawings

5,547,622

BINDER FOR FIBER REINFORCED COMPOSITES

FIELD OF THE INVENTION

The field of the present invention is the production of fiber-reinforced, ceramic composite articles. Most specifically, the present invention is directed to novel binders to be used in the production of such articles.

BACKGROUND OF THE INVENTION

Fiber-reinforced, ceramic composite articles have been known to the art for a number of years. In a typical construction, the articles comprise two basic components: (1) a ceramic matrix material such as a glass, a glass-ceramic, or a crystalline ceramic material; and (2) inorganic, refractory fibers which are entrained therein to provide a reinforcing phase. The patent literature contains numerous references to a wide variety of ceramic matrix materials and fiber compositions, as well as to almost limitless combinations of matrix materials and fibers. U.S. Pat. Nos. 4,314,852 and 4,615,987 provide but a small sample of the structure and production of such composites.

Fiber-reinforced composites utilizing ceramic matrix materials are typically prepared from finely-divided particles of the desired matrix materials, or a precursor for the desired matrix material. The fibers are combined with those particles and consolidated to dense composite articles via the application of heat and pressure. To assure that the fibers will be homogeneously distributed throughout the matrix material, the finely-divided powders of the matrix material are customarily first dispersed within a liquid vehicle to form a suspension or slurry. This suspension is thereafter applied to the fibers as a coating. In the case of short fibers, the fibers may be admixed into the slurry to produce a homogeneous dispersion of the fibers.

Typically, dispersions of matrix powders in liquid vehicles contain various binders, solvents, surfactants, and dispersing agents. These additives function to stabilize the dispersion and impart thereto such desirable properties as rapid drying and some flexibility in the article after drying has occurred, but before firing thereof to consolidation. A plasticizer may also be included to enhance the flexibility and, hence, the formability of the dried, but unfired, article.

Experience has demonstrated that such suspensions must be carefully formulated, handled and stored in order to be used effectively. For example, the ceramic powders are quite prone to settle out in the suspensions. Consequently, continuous mixing is frequently demanded to assure homogeneity therein. Means for stabilizing the suspensions against changes in viscosity, which changes are encountered commonly during storage or in the use thereof, may be required to avoid undesirable changes in the coating or in the fiber-impregnation characteristics of the suspension.

In summary, in the customary procedure for producing fiber-reinforced ceramic composites, it is necessary to go through an intermediate operation during which a powdered form of the ceramic is dispersed within a tow of fibers and bound in place via an organic/polymeric binder. This intermediate product, termed a "prepreg", must be capable of being fashioned into a desired shape for the final composite article. The shaped body is thereafter processed to remove ("burn out") the binder without forming significant carbonaceous residue. It is then consolidated through sintering to produce the final composite article.

U.S. Pat. No. 5,024,978 (Allaire et al.) describes a binder system which has been successfully employed in the manufacture of fiber-reinforced, ceramic composite articles. Fundamentally, that system comprises a blend of a thermoplastic organic polymeric material and a thermoplastic organic wax. The system makes it possible to uniformly impregnate the fiber tow with ceramic powder and to prevent the powder from falling away during handling and processing of the resulting prepreg. The prepreg may then be readily formed and shaped, and the binder removed therefrom without significant carbonaceous residue being developed.

Field experience with that binder system, however, has identified the following shortcomings therein encountered in the processing of the composite. These shortcomings are specifically related to the presence of a substantial amount of wax material in the prepreg.

(a) A significant amount of the thermoplastic binder is a wax component which must be removed in an initial "dewaxing" process to inhibit the flowing out of the binder and the ceramic powder during the burning out of the polymeric material. That dewaxing process must be controlled very precisely.

(b) With certain matrix materials, it is necessary, or at least desirable, to remove the wax before the initial forming or shaping of the composite article. In those situations, the wax is acting only as a solvent for the polymeric materials in the binder component and, consequently, offering no benefit to the composite prepreg.

(c) The wax is volatilized off during the dewaxing operation plus some wax vaporizes off during the impregnation process in which the fiber tow passes through the molten binder-powder slurry. That volatilized wax presents maintenance problems with wax buildup in the ventilation system.

(d) To achieve the desired low viscosity in the binder-powder slurry to promote its impregnation into the fiber tow, the temperature of the slurry must be maintained at a relatively high temperature (customarily about 140° C.). Such temperatures pose a safety concern and also contribute to vaporization of the wax.

One advantage of the wax-based thermoplastic binder system, however, is the extremely fast set which occurs upon exit from the impregnation bath. The preferred wax-based thermoplastic binder system employs a thermally-reversible gel to enhance the setting rate of the binder. This prevents powder migration and allows rapid handling of the tow. This is advantageous in processing of the tow. Also, the gel structure of the preferred wax-based thermoplastic binder system facilitates the subsequent removal of the wax components by volatilization without the occurrence of powder migration during the "dewaxing" process.

There are two fundamental alternatives to the wax-based thermoplastic binder system disclosed in U.S. Pat. No. 5,024,978 that will yield a prepreg exhibiting the desired characteristics:

The first alternative contemplates an organic solvent-based binder which will dry very rapidly after the fiber tow is impregnated with the binder-powder slurry. That has not proven to be a feasible solution to the problem. The organic solvent-vapor released upon drying creates major safety, health, and environmental issues which must be addressed. Also, even if very rapid drying solvents are employed to maintain the handling advantages of the wax-based thermoplastic binder system, it is unlikely that powder migration will be prevented.

The second alternative contemplates a water-based (aqueous) binder system. Our invention is directed to such a system.

Aqueous binders are well known to the art and have been employed commercially. The primary drawback encountered in the use of aqueous binders has been the very slow evaporation of water such that the uniform distribution of the ceramic powder cannot be readily maintained. The use of aqueous binder systems has also been limited by a need to pre-dry the impregnated fiber tow, prior to winding/forming.

The principal objective of the present invention was to develop a novel aqueous binder system for use in the manufacture of fiber-reinforced, ceramic composite articles which would avoid the problems experienced in former water-based binder systems. The rapid settling advantage of the particular aqueous binder system proposed maintains the handling and prevention of powder migration advantages of the wax-based binder system in U.S. Pat. No. 5,024,978.

SUMMARY OF THE INVENTION

The inventive binder system comprises two basic components, viz., a water-soluble, organic polymer and a cross-linking agent therefor. Thus, the invention involves the use of an aqueous solution of a water-soluble, organic polymer in which the ceramic powder is dispersed to produce a slurry to impregnate the fiber tow. To address the problem of maintaining a uniform distribution of the ceramic powder in the fiber tow, the water-soluble polymer in the aqueous solution is gelled by applying a cross-linking agent onto the impregnated fiber tow after its being in contact with the binder-powder slurry. The cross-linking agent selected is one which reacts very quickly with the polymer to form a gel. Thus, in the customary process for impregnating a fiber tow, the instant invention contemplates contacting, for example, by spraying, the impregnated tow with the cross-linking agent as the tow emerges from the slurry bath.

The cross-linking agent reacts with the water-soluble polymer to form a gel-like solid material which retains the water of the solution, but does not allow flow of the polymer, or movement of the ceramic powder, within the fiber tow. The gel demonstrates a substantial degree of strength. The gel makes it possible to wind the fiber tow onto a roller and to handle the resulting prepreg without removing the water (if desired), without experiencing any significant loss of ceramic powder, and with minimal fiber damage or breakage. However, the properties of the gel also make it possible to remove the water from the prepreg without any appreciable flow of polymer or loss of ceramic powder.

Being able to gel the polymer after the fiber tow has been impregnated renders it possible to utilize very low viscosities in the binder-powder slurry at room temperature. That capability makes the impregnation process safer to operate and can reduce the rate at which easily volatilized ingredients are vaporized from the slurry. It may also reduce fiber damage during the impregnation procedure.

The cross-linked polymer gel exhibits excellent burn out characteristics. This feature of the polymer gel is not observed in most cross-linked polymeric materials. It permits the polymer binder to be removed without any substantial amount of carbonaceous residue being produced.

Furthermore, it has been demonstrated that, by wetting the surface of the prepreg, an adhesive property is imparted to the surface thereof. That faculty enables multiple plies of prepreg material to be easily laid up and adhered together during the process of fabricating a composite article. Self-evidently, this constitutes a very desirable characteristic in the binder.

PRIOR ART

U.S. Pat. No. 5,024,978 provided the point of departure for the present invention, which invention was designed to comprise an improvement upon the invention disclosed in that patent.

DESCRIPTION OF PREFERRED EMBODIMENT

Partially hydrolyzed polyvinyl alcohol is the preferred water-soluble, organic polymer because it provides the desired rheological behavior (low yield and viscosity) for impregnating the fiber tow. Polyvinyl alcohol also has the versatility of crosslinking with a wide variety of soluble inorganic ions such as borates, sulfates, and carbonates, as well as organic polymers such as anionic polyacrylates. Accordingly, the laboratory work described below will be focussed on that compound.

Nevertheless, other water-soluble, organic polymers are contemplated within the scope of the instant invention. These include ethylene vinyl alcohol, polyacrylic acid, carboxymethyl cellulose, guar gum, and mixtures therebetween and with polyvinyl alcohol.

In like manner, borax and ammonium polyacrylate have been found to comprise the most preferred cross-linking agents such that the following laboratory work is described employing those compounds. Again, however, other materials capable of cross-linking with polyvinyl alcohol and/or other water soluble polymers are contemplated as being within the scope of the invention. Such examples can include organometallic cross linking agents, such as Tyzor DBA, a mixed titanium ortho ester complex marketed by E. I. DuPont de Nemours Company, Wilmington, Del.; KR-138S, marketed by Kenrich Petrochemicals, Bayonne, N.J., another mixed titanium ortho ester complex; and K-Sperse 152, marketed by King Industries, Inc., Norwalk, Conn., a zinc salt of alkyl naphthalene sulfonic acid dissolved in ethylene glycol butyl ether.

Two basic, binder-plus-glass powder formulations are provided below, expressed in terms of weight percent, the formulation entitled A being the more preferred.

|  | A | B |
|---|---|---|
| Glass powder | 50.54 | 50.00 |
| Tamol 963 | 0.57 | 0.57 |
| Polyvinyl Alcohol 540s | 2.81 | 1.79 |
| Glycerol | 2.81 | 1.39 |
| Oleic Acid | 11.37 | 8.44 |
| Water | 32.27 | 38.18 |

The glass powder has a barium magnesium aluminosilicate composition of the type described in U.S. Pat. No. 4,615,987 (Chyung et al.). It is thermally crystallizable upon appropriate heat treatment to produce a glass-ceramic matrix containing barium-stuffed cordierite as the predominant crystal phase. The glass powder exhibited an average particle size of about 10 μm. The glass had the following approximate composition, expressed in terms of parts by weight on the oxide basis. Because the sum of the components closely approximates 100, however, for all practical purposes, the value for each individual component may be deemed to represent weight percent.

| | | | |
|---|---|---|---|
| SiO$_2$ | 44.85 | Nb$_2$O$_5$ | 0.95 |
| Al$_2$O$_3$ | 34.65 | B$_2$O$_3$ | 0.95 |
| MgO | 12.09 | K$_2$O | 0.14 |
| BaO | 5.76 | As$_2$O$_3$ | 0.64 |

Tamol 963 is a mixture of 35% ammonium polyacrylate and 65% water. It is marketed by Rohm and Haas. In small amounts, i.e., less than 5%, it performs as a dispersant. Polyvinyl alcohol 540s is an 88% hydrolyzed polymer having a molecular weight of 124,000–186,000. It is marketed by Air Products, Inc. Glycerol acts as a plasticizer and oleic acid as a lubricant.

The two preferred cross-linking formulations are tabulated below, again expressed in terms of weight percent.

| | C | D |
|---|---|---|
| Ammonium polyacrylate | 35 | — |
| Water | 65 | 95 |
| Borax | — | 5 |

Ammonium polyacrylate may be used in minor amounts as a dispersant. Amounts of 0.2–1%, based on the formulation, are preferred for this purpose. In larger amounts, ammonium polyacrylate functions as a gellant. An interaction between the ammonium polyacrylate and the polymer binder was observed in the absence of glass powder, thereby confirming that the gelation was not flocculation related. The polyacrylate and polymer alone exhibited gel syneresis, when tested without the glass powder present. However, it is not desirable to employ amounts greater than about 35% because such larger amounts unduly increase the viscosity of the cross-linker formulation.

We prefer borax as a source of borate ion, the effective group for cross-linking. However, other sources of borate ion may also be employed. Under ambient conditions, concentrations of borax from 2% up to about 5% may be employed. Higher concentrations of soluble borate ion can be obtained by dissolving borax at relatively higher temperatures on the order of 40°–50° C. We prefer a concentration not over about 5%.

The operating viscosity of the binder formulation has been adjudged to range about 400–500 cps under ambient conditions. At too low a binder concentration, settling out of the glass powder can occur. Low levels result in insufficient handling strength from inadequate cohesiveness of the tow. High levels result in too high a viscosity. Consequently, at least about 0.75% of the water-soluble, binder polymer has been deemed desirable, but concentrations in excess of about 5% are uneconomical.

The use of dispersants, plasticizers, and lubricants in binder formulations is well known in the art. Their use in conventional amounts is contemplated in the present process, the total of those components customarily not exceeding about 25%.

The preferred process identified for employing the inventive binder-cross linking system in producing an impregnated fiber tow involved impregnating the tow by means of a single immersion into the glass-aqueous binder slurry. This was followed by spraying the gellant onto the tow as the tow emerged from the slurry. A flexible, collimated tape was obtained by rolling the impregnated tow onto a drum equipped with a TEFLON® liner. As noted above, when the tape was re-wetted with water, it became soft and tacky.

Thus, the impregnation process, as conducted in the laboratory, involved the following steps:

(1) the sizing was removed from the fiber, which fiber, in the work discussed here, was SiC;

(2) the tow was immersed under ambient conditions into the glass-aqueous binder slurry;

(3) the impregnated tow was drawn through a stripping die to remove excess slurry;

(4) the cross-linking formulation was sprayed onto the tow to gel the aqueous binder system essentially instantly;

(5) the gelled, impregnated tow was rolled onto a drum under ambient conditions and allowed to dry; and then (6) the dried, collimated tape was peeled off the liner.

The wet strength of the tape can be altered by changing the plasticizer and/or changing the molecular weight of the binder. To illustrate:

When polyethylene glycol having a molecular weight of 200 was substituted for glycerol, a weak gel was developed which was less desirable.

Likewise, the substitution of polyvinyl alcohol having a lower molecular weight for the 540s polymer yielded a weaker gel. One can conceivably use a 100% hydrolyzed polyvinyl alcohol to enhance the strength of the gel, but higher temperatures (90°–100° C.) are required to solubilize the polyvinyl alcohol. However, a blend of partially and fully hydrolyzed polyvinyl alcohols can be used to produce a gel of desired strength.

The prepregs prepared with borax as the gellant exhibited a flexible character, whereas those prepared with ammonium polyacrylate as the gellant were very stiff.

The binder from both gellant systems could be removed without any significant carbonaceous residue by heating to about 500° C. in either air or nitrogen. In the laboratory work described here, the prepregs were heated at a rate of about 5° C./minute. That rate was utilized as a matter of convenience only. More rapid or slower rates will also be operable.

After removal of the binder, the prepregs retained their shape, unlike the prepregs produced through the thermoplastic wax system described in U.S. Pat. No. 5,024,978, supra. This shape retention feature can be advantageous in preventing glass powder from falling out before the consolidating sintering process.

The prepreg shapes, after removal of the binder, were hot pressed to consolidation. A temperature of 1250° C. was utilized in the described laboratory work. Again, higher or lower temperatures can be employed, as is recognized by workers in the fiber-reinforced, ceramic composite art. A flex modulus measured at room temperature averaged about 621–690 MPa (90–100 ksi) and did not appear to be affected by the binder burnout atmosphere, i.e., either air or nitrogen.

A maximum fiber content in the composite of about 41.2 volume percent was achieved employing the borax gellant, and about 39.2 volume percent employing ammonium polyacrylate as the gellant.

We claim:

1. In the method for making an inorganic, fiber-reinforced, ceramic composite article comprising the steps of (a) contacting inorganic, reinforcing fibers with a liquid dispersion of a powder of a ceramic matrix material, said liquid dispersion containing an organic binder material to bond a coating of said ceramic matrix powder to said fibers;

(b) removing said binder material from said powder-coated fibers; and then (c) consolidating said powder-coated fibers through the application of heat and pressure thereto; the improvement comprising (A) utilizing a water-soluble polymer as said binder material; and
(B) contacting said powder-coated fibers with an aqueous solution of a cross-linking agent which reacts with said water-soluble polymer binder material to form a gel.

2. A method according to claim 1 wherein said water soluble polymer binder material is selected from the group consisting of polyvinyl alcohol, ethylene vinyl alcohol, polyacrylic acid, carboxymethyl cellulose, guar gum, and mixtures thereof.

3. A method according to claim 2 wherein said water soluble polymer binder material consists of partially hydrolyzed polyvinyl alcohol.

4. A method according to claim 1 wherein said cross linking agent is selected from the group consisting of soluble inorganic borate, sulphate and carbonate ions, organic anionic polyacrylates, mixed titanium ortho ester complexes, and zinc salts of alkyl naphthalene sulfonic acid dissolved in ethylene glycol butyl ether.

5. A method according to claim 4 wherein said cross-linking agent is selected from the group consisting of ammonium polyacrylate and borax.

6. A method according to claim 4 wherein the cross-linking agent is ammonium polyacrylate and is present as a dispersant in an amount not over about one percent.

7. A method according to claim 4 wherein the cross-linking agent is ammonium polyacrylate and is present as a gellant in an amount not over about 35%.

8. A method according to claim 1 wherein said water-soluble polymer binder material is present in an amount of at least 0.75% by weight.

9. A method according to claim 1 wherein said cross-linking agent consists of an aqueous solution of ammonium polyacrylate wherein said ammonium polyacrylate comprises at least 25% by weight.

10. A method according to claim 1 wherein said cross-linking agent consists of an aqueous solution of borax wherein said borax comprises at least 2% by weight.

11. A method according to claim 1 wherein said powder-coated fibers are contacted with said aqueous solution of a cross linking agent through spraying of said solution.

12. A method according to claim 1 wherein said ceramic matrix material is a barium magnesium aluminosilicate glass capable of being crystallized to a glass-ceramic containing barium-stuffed cordierite as a primary crystal phase.

13. A method according to claim 1 wherein the inorganic, reinforcing fibers comprise up to 40–45% of the composition article.

14. A method according to claim 1 wherein the reinforcing fibers are in the form of a tow, the fiber tow is contacted by immersion in a liquid slurry of the ceramic powder and organic binder to impregnate the fiber tow, the impregnated tow is sprayed with a cross-linking agent as it emerges from the slurry to form a gel and the gel-containing tow is rolled on a drum to produce a flexible tape.

* * * * *